US012698064B2

(12) United States Patent
Dykstra

(10) Patent No.: US 12,698,064 B2
(45) Date of Patent: Aug. 4, 2026

(54) BELOW WATER-LINE HULL REPAIR SYSTEM USING COMPOSITE PATCH HEATED BY FERROMAGNETIC HEATING DEVICE

(71) Applicant: Temper IP, LLC, Cedar Springs, MI (US)

(72) Inventor: William C. Dykstra, Rockford, MI (US)

(73) Assignee: Temper IP, LLC, Cedar Springs, MI (US)

( * ) Notice: Subject to any disclaimer, the term of this patent is extended or adjusted under 35 U.S.C. 154(b) by 434 days.

(21) Appl. No.: 18/497,164

(22) Filed: Oct. 30, 2023

(65) Prior Publication Data

US 2024/0149991 A1 May 9, 2024

Related U.S. Application Data

(60) Provisional application No. 63/382,538, filed on Nov. 7, 2022.

(51) Int. Cl.
*B63B 43/16* (2006.01)
*H05B 6/10* (2006.01)

(52) U.S. Cl.
CPC ............. *B63B 43/16* (2013.01); *H05B 6/101* (2013.01)

(58) Field of Classification Search
CPC .... B63B 43/16; H05B 6/101; H05B 2206/023
See application file for complete search history.

(56) References Cited

U.S. PATENT DOCUMENTS

| | | | | |
|---|---|---|---|---|
| 6,495,265 | B1 | 12/2002 | Krebs et al. | |
| 7,029,267 | B2 * | 4/2006 | Caron | B29C 70/443 425/389 |
| 8,721,822 | B2 * | 5/2014 | Hood | B29C 65/3616 156/95 |
| 2004/0091694 | A1 | 5/2004 | Holzer et al. | |
| 2010/0071539 | A1 | 3/2010 | Boczek et al. | |

(Continued)

FOREIGN PATENT DOCUMENTS

| | | | |
|---|---|---|---|
| EP | 0184760 A2 | 6/1986 | |
| WO | 2022213078 A1 | 10/2022 | |

OTHER PUBLICATIONS

Naval Surface Warfare Center Carderock Division "The Use of Composites to Repair and Replace Damaged Metallic Ship Structures and Components", Daneil Hart (Year: 2015).*

*Primary Examiner* — Anthony D Wiest
(74) *Attorney, Agent, or Firm* — HONIGMAN LLP

(57) ABSTRACT

A method for repairing a damaged area of a hull of a water vessel includes providing a patch assembly having (i) a first flexible outer layer, (ii) a second flexible outer layer and (iii) an inner layer of composite material sealed between the first flexible outer layer and the second flexible outer layer. When the inner layer is heated and then cures, the composite material transforms from a flexible uncured state to a fixed cured state. With the composite material in the uncured state, the patch assembly is positioned at a damaged area of a hull of a water vessel and conforms to a shape of the hull. An electric heating element is electrically operated to heat the inner layer, and when the inner layer is cured, the composite material is cured, where the shape of the inner layer is fixed relative to the shape of the hull.

42 Claims, 14 Drawing Sheets

(56) References Cited

U.S. PATENT DOCUMENTS

| | | | | |
|---|---|---|---|---|
| 2015/0260483 | A1 | 9/2015 | Wibby et al. | |
| 2016/0121585 | A1 * | 5/2016 | Jennings | B29C 73/10 428/141 |

* cited by examiner

BELOW WATER-LINE HULL REPAIR SYSTEM USING COMPOSITE PATCH HEATED BY FERROMAGNETIC HEATING DEVICE

CROSS REFERENCE TO RELATED APPLICATION

The present application claims the filing benefits of U.S. provisional application Ser. No. 63/382,538, filed Nov. 7, 2022, which is hereby incorporated herein by reference in its entirety.

FIELD OF THE INVENTION

The present invention relates generally to a method and system for the heating of an object or heated curing, repairing, debulking, joining, welding, bonding, co-bonding, hot-bonding, fusing, or affixing of one or two or more components, and more specifically to a method and system for the heating of an object or heated curing, repairing, debulking, joining, welding, bonding, co-bonding, hot-bonding, fusing or affixing of one or two or more components using an electro-magnetic field to heat one or more ferromagnetic structures.

BACKGROUND OF THE INVENTION

Traditionally, when a watercraft or water vessel, such as a boat, ship, yacht, or submarine, sustains damage to its hull at or near or below the water-line (e.g., FIGS. 1 and 2), the vessel must be removed or raised from the water to access the damage and perform the repair. For example, a vessel, such as a metal hull ship, may be completely removed from the water at a port or marina or the vessel may be raised from the water using a floating dry dock. However, access to floating dry docks is limited and traditional methods of removing or raising vessels to perform repairs below the water-line are costly, difficult, and require significant time.

SUMMARY OF THE INVENTION

A repair or patching system allows for the repair of damage to the hull of a water vessel that is at or near or at least partially below the water-line (i.e., the damaged area of the hull may be at least partially submerged). The repair system includes a patch assembly that includes a first flexible outer layer, a second flexible outer layer, and an inner layer of composite material sealed between the first flexible outer layer and the second flexible outer layer. When the inner layer is heated and allowed to cool, the composite material transforms from an uncured state, where a shape of the inner layer is flexible, to a cured state, where the shape of the inner layer is fixed. One or more ferromagnetic heating elements are disposed between the inner layer and the first and/or second flexible outer layers. When the one or more ferromagnetic heating elements are electrically operated, the one or more ferromagnetic heating elements generate heat at the inner layer.

Thus, with the composite material in the uncured state, the patch assembly is positioned at a damaged area of a hull of a water vessel so that an outer surface of the patch assembly engages the hull at and around the damaged area and the shape of the inner layer flexes to conform to a shape of the hull. With the patch assembly engaging the hull and with the shape of the inner layer flexed to conform to the shape of the hull, the one or more ferromagnetic heating elements are electrically operated to generate heat at the inner layer. After electrically operating the ferromagnetic heating element, the inner layer is cooled to the cured state, where the shape of the inner layer is fixed relative to the shape of the hull. With the shape of the inner layer fixed relative to the shape of the hull, at least the inner layer of the patch is attached to the hull at and around the damaged area.

These and other objects, advantages, purposes and features of the present invention will become more apparent upon review of the following specification in conjunction with the drawings.

DESCRIPTION OF THE PREFERRED EMBODIMENTS

Figure 2:
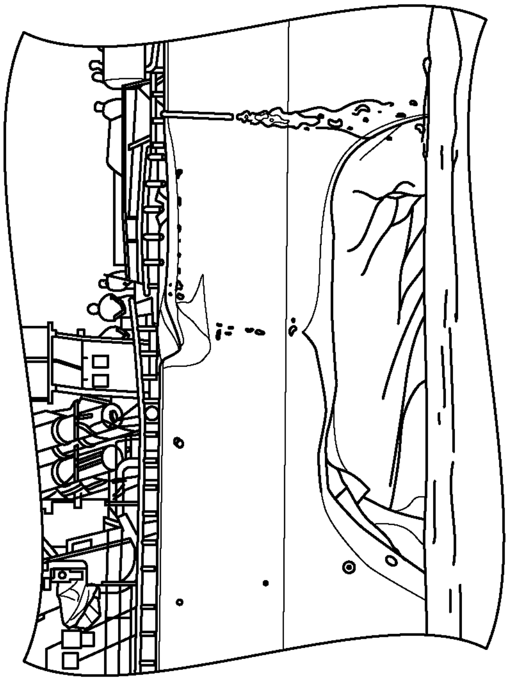
FIGS. 1 and 2 depict examples of damage to the hull of a vessel below its water-line.
Figure 1:
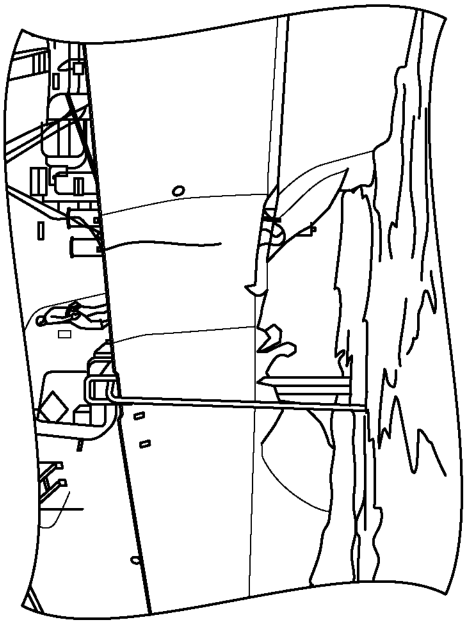
Figure 3A:
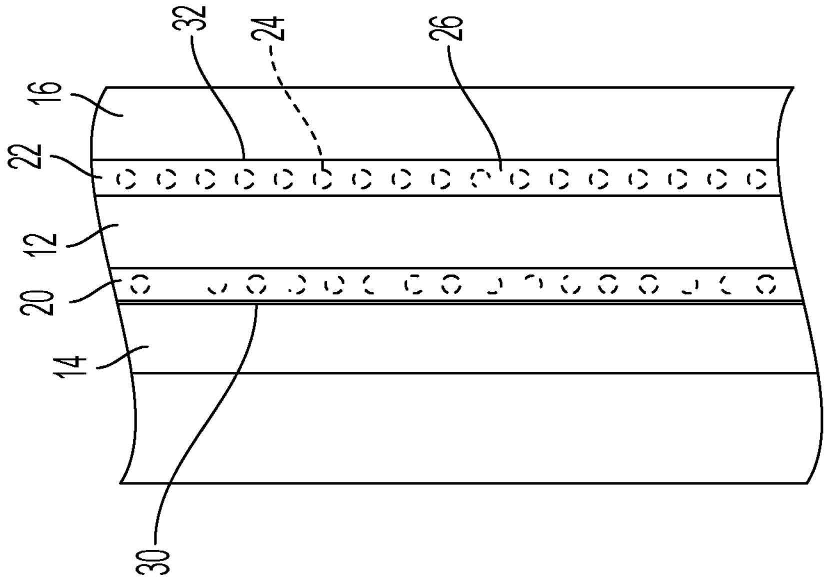
FIG. 3A is a sectional view of the patch assembly taken along line A-A in FIG. 3.
Figure 3:
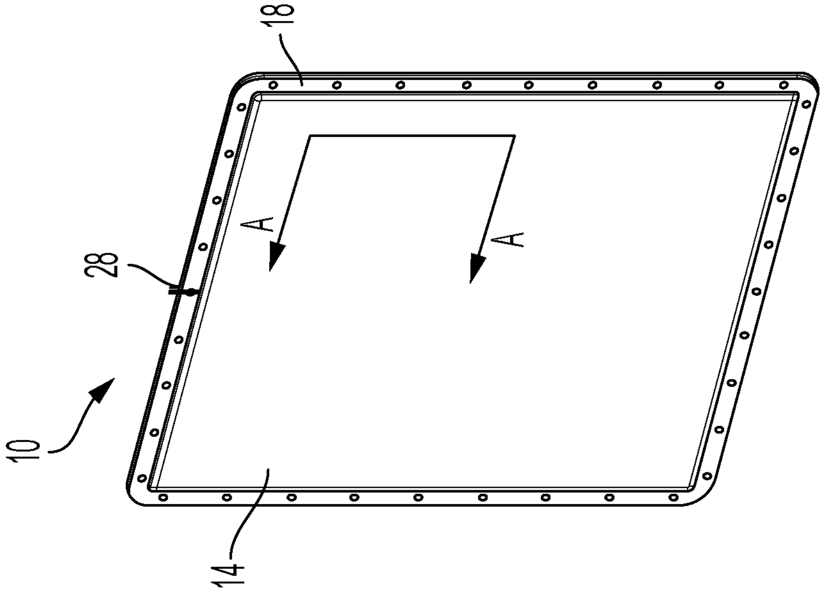
FIG. 3 is a perspective view of a patch assembly for repairing damage to the hull of a vessel below its water-line.
Figure 4A:
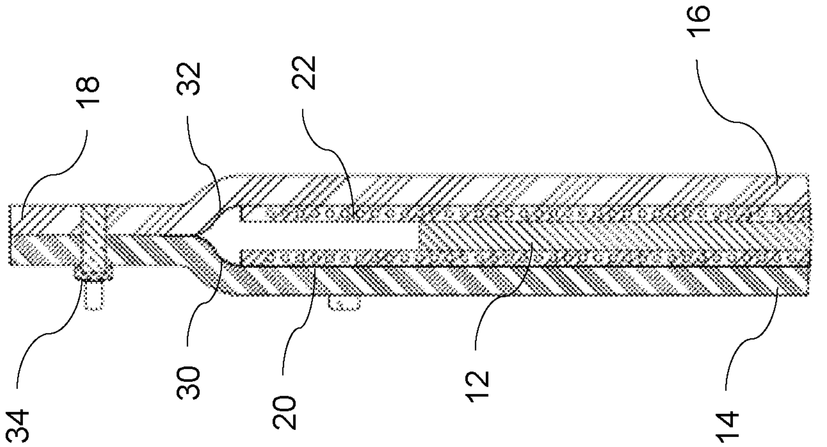
FIG. 4A is a sectional view of the patch assembly taken along line A-A in FIG. 4.
Figure 4:
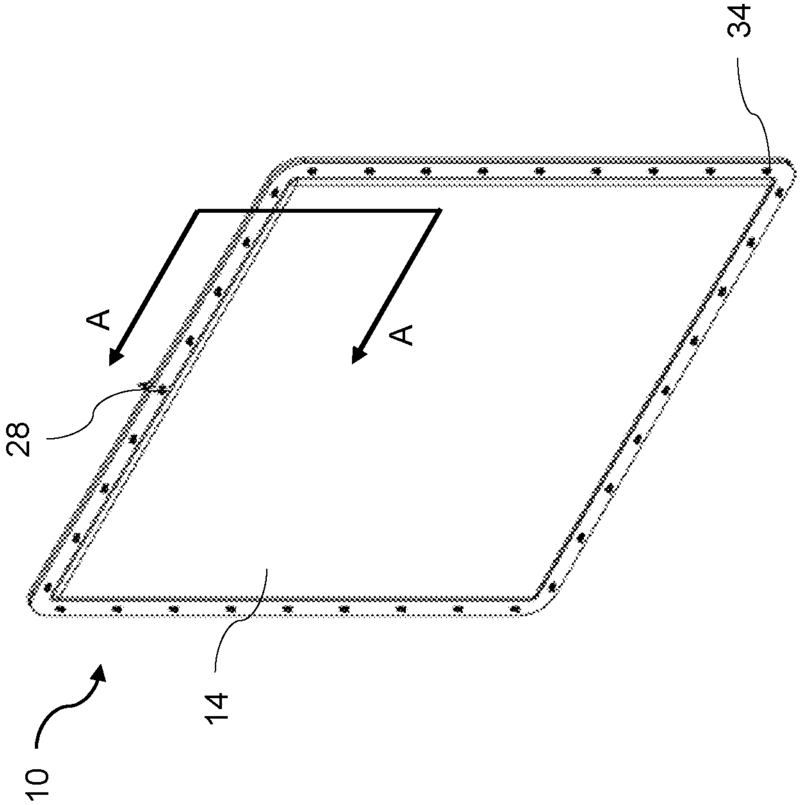
FIG. 4 is a perspective view of the patch assembly.
Figure 5:
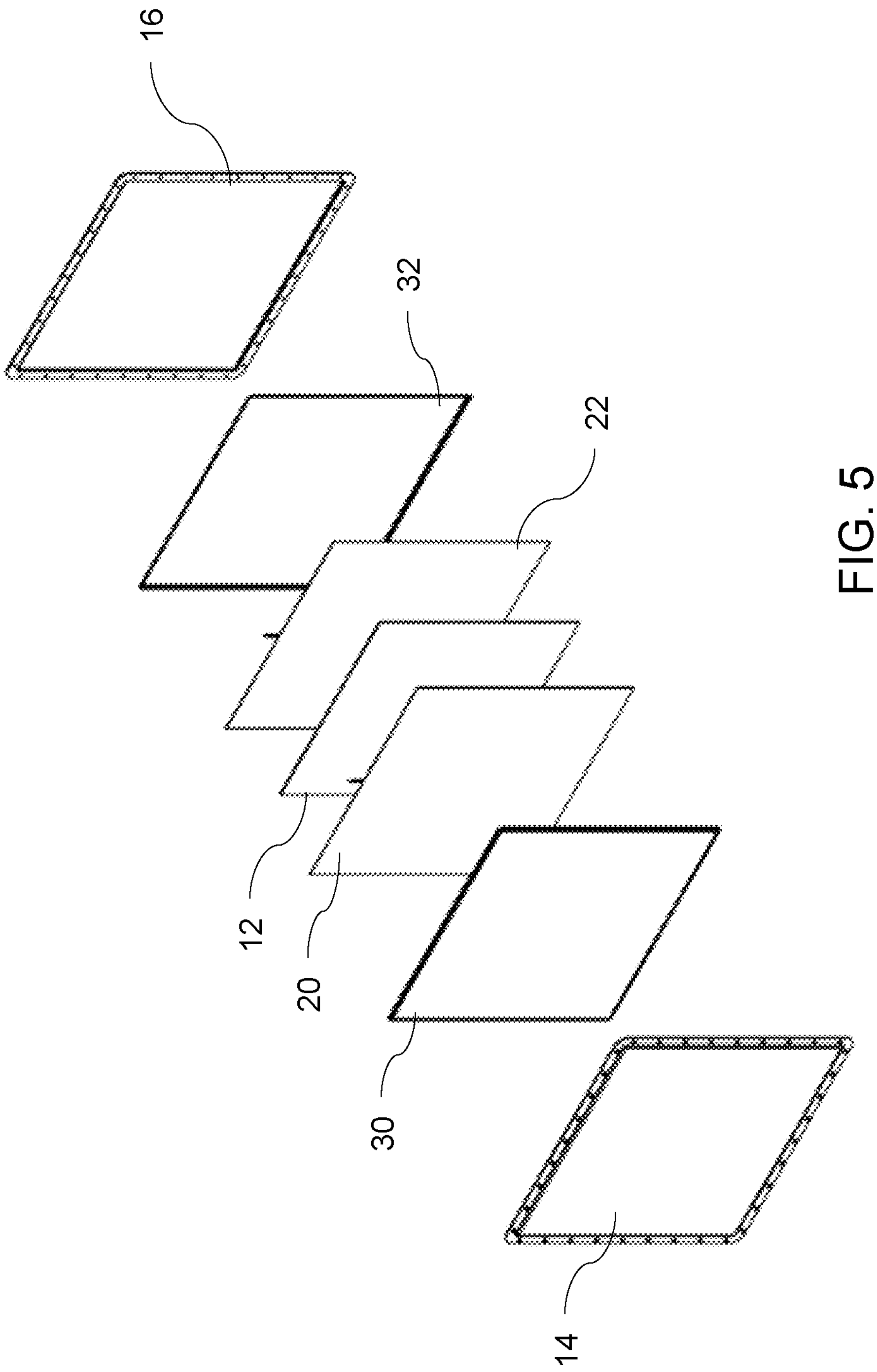
FIG. 5 is an exploded view of the patch assembly.

Referring now to the drawings and the illustrated embodiments depicted therein, a temporary composite repair system or repair system or patching assembly 10 for repairing a damaged area (FIGS. 1 and 2) of a hull of a watercraft or water vessel (such as a boat, ship, yacht, submarine, personal watercraft, and the like) includes an inner layer or composite layer 12 sandwiched between a first outer layer 14 and a second outer layer 16 (FIGS. 3-5). The first and second outer layers 14, 16 comprise a flexible and thermally insulating material, and the inner layer 12 comprises a composite layer or fabric including fibers and resin. When the composite material of the inner layer 12 is uncured, the inner layer 12 is flexible or pliable such that the shape or contour of the inner layer 12 flexes or conforms to the hull, and after the composite material of the inner layer 12 is cured (i.e., after heat is applied to the composite material and the composite material is cooled), the shape or contour of the inner layer 12 is rigid and fixed. One or more heating elements, such as one or more ferromagnetic heating blankets, are disposed between the first and second outer layers and electrically operable to heat the inner layer 12 to cure the composite material.

Thus, the patch 10, with the inner layer 12 in an uncured state, may be positioned at a damaged area of the hull, such as at or around a hole or dent or other structural deformity, and the patch 10 engages the hull and flexes to conform to the outer surface or shape of the hull at and around the damaged area. For example, the patch 10 may be positioned over a hole in the hull and, when conformed to the shape of the hull around the hole, the patch 10 substantially mimics or matches the shape of the hull if the hole were not present. That is, the patch 10 provides a continuous surface between non-damaged areas of the hull and extending along and over the damaged area of the hull. With the patch 10 and inner layer 12 conformed to the hull, the heating element is electrically operated to heat the inner layer 12 so that, after the heat is applied to the inner layer and upon cooling, the inner layer 12 is cured and the shape of the inner layer 12 and patch 10 is fixed relative to the shape of the hull. After the shape of the inner layer 12 is fixed relative to the hull, at least the inner layer 12 of the patch 10 is attached to the hull (such as via an adhesive and/or fasteners) at and around the damaged area to at least temporarily repair or cover the damaged area and seal the hull.

As discussed further below, the repair system 10 is configured to repair damaged areas of vessels where the damage to the hull is at or near or below the water-line of the vessel and thus may be at least partially submerged. Because the inner layer 12 and the heating element are sealed between the first outer layer 14 and the second outer layer 16, the repair system 10 may be operated when at least partially submerged in water. Thus, the damaged area may be patched or repaired while the vessel is in the water so that, after repair and with the patch attached to the hull at the damaged area, the vessel may continue operation and/or travel to a port or a dry docking facility for more extensive repairs. The patch 10 may be applied at the exterior side of the hull or at the interior side of the hull.

The inner layer 12 comprises a woven fabric sheet or layer of composite material, such as a woven thermoplastic or thermoset resin with KEVLAR® or fiberglass reinforcement. The composite material may include commingled composites using strands of woven thermoplastic next to strands of reinforcing fiber. For example, the layer of composite material may comprise any suitable composite material, such as those available from Concordia Fibers, LLC of Coventry, RI. Commingled fabrics of fiber and thermoplastic resin provide a potentially infinite shelf life, there is no need to defuse resin into fibers, and the fabric is flexible prior to heating or curing. The inner layer 12 may be heated at or above a threshold temperature and then actively or passively cooled to cure the inner layer 12. After curing, the inner composite layer 12 is rigid and its shape is fixed so that, when attached to the hull of the vessel around the damaged area, the composite material may provide structural support to the hull of the vessel and/or seal an opening in the hull.

The first outer layer 14 and the second outer layer 16 comprise a flexible and thermally insulating material, such as a foamed silicone. The inner layer 12, the one or more heating elements, and any other internal components of the patch assembly 10 are sealed between the first outer layer 14 and the second outer layer 16, which are joined together at a perimeter region 18 of the patch 10 (FIG. 3). The flexible and thermally insulating material retains heat generated by the one or more heating elements so that the inner layer 12 may more quickly reach its threshold curing temperature. Furthermore, the outer layers flex with the inner layer 12 to conform the patch 10 to the shape of the hull of the vessel.

Thus, the patch assembly 10 is flexible prior to being applied to the vessel's hull so that the patch may be flexed to conform to the shape of the vessel's hull. With the inner layer 12 and patch conformed to the shape of the vessel's hull, the inner layer 12 is heated to cure the inner layer 12 and fix the shape of the composite layer relative to the shape of the hull. The patch assembly 10 includes at least one heating element disposed between the inner layer 12 and the outer layers 14, 16 and that is electrically operable to heat the inner layer 12 when the patch 10 is engaging the hull. Because the patch system 10 is configured to repair damage at or below the water-line of the vessel, the heating element is configured to overcome the thermal load of being submerged in water and heat the inner layer 12 to a suitable temperature to cure when cooled. For example, the inner layer 12 may require sustained heating of 250 degrees Fahrenheit or more to properly cure. Thus, the heating element may have a sufficiently high Watt density to achieve the level of heating necessary to cure the composite material, such as a Watt density that is higher than what can be generated using a traditional resistive heating system.

Figure 11:
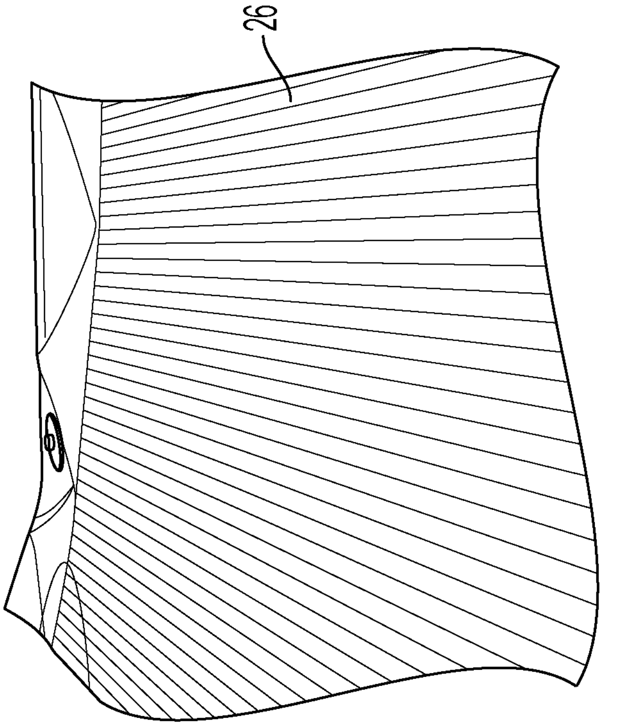
FIG. 11 is a perspective view of a ferromagnetic heating blanket.

To overcome the thermal load of heating the inner layer 12 while the patch 10 is at least partially submerged, the one or more heating elements may comprise ferromagnetic heating blankets. In the illustrated embodiment, the patch 10 includes a first ferromagnetic heating blanket 20 disposed between the inner layer 12 and the first outer layer 14 and a second ferromagnetic heating blanket 22 disposed between the inner layer 12 and the second outer layer 16. The ferromagnetic heating blankets 20, 22 each include one or more ferromagnetic wires or heating elements 24 (FIG. 12) embedded in a substrate 26 (such as a flexible silicone sheet or a rigid metal slab or the like) (FIG. 11), where the ferromagnetic wire 24 includes a ferromagnetic material **24*a* wrapped around an electrically conductive material 24*b*. When the ferromagnetic blankets are electrically operated, the electrically conductive material 24*a* is electrically charged to generate a magnetic field at the heating blanket and the ferromagnetic material 24*b*** generates heat when exposed to the magnetic field.

Given the proper conditions, an electrically conductive ferromagnetic substance will experience heating when subject to a sufficiently high-frequency electromagnetic field. Ferromagnetic materials such as iron, nickel, cobalt, and their many alloys, have a composition-specific temperature, the Curie temperature, above which their relative magnetic permeability ($\mu_r$) decreases until it is approximately equal to that of ordinary air or a vacuum, and electromagnetically induced ferromagnetic heating ceases to occur. The electromagnetic heating process is capable of extremely efficient and rapid energy transfer, and electromagnetic heating has been demonstrated to produce temperature rises of hundreds of kelvins in less than a second.

Electromagnetic fields can pass through many electrical insulators, such as air, glass, plastics, and non-metallic ceramics, without heating them, and if conductive materials, such as ferrous alloys, copper, aluminum, etc., are located in the electromagnetic field, a field of the appropriate frequency range will heat only the conductive materials.

The heating blanket and system and ferromagnetic heating elements may utilize aspects of the heating blankets and systems and ferromagnetic heating elements described in International Publication No. WO 2022/213078, which is hereby incorporated herein by reference in its entirety.

Figure 12:
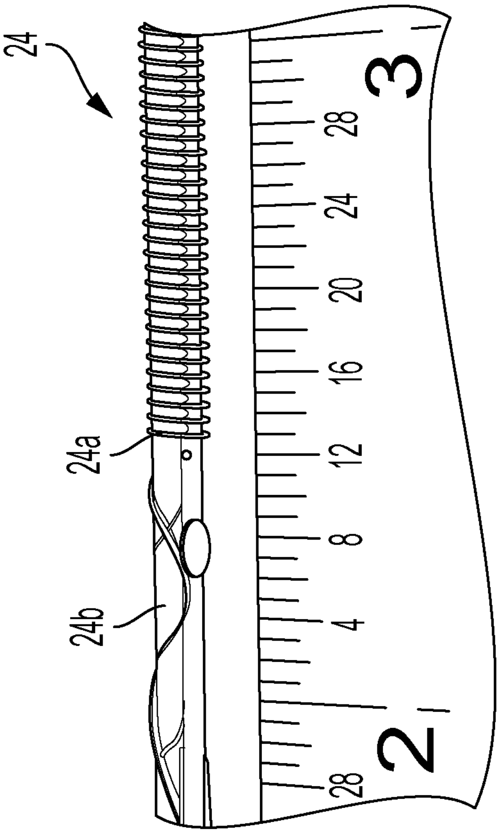
FIG. 12 is a perspective view of a ferromagnetic heating element of the ferromagnetic heating blanket of FIG. 11.

As shown in FIG. 12, the ferromagnetic wires 24 or heating elements embedded within the body of the heating blanket include an electrically conductive wire 24*b* (such as a copper wire or an electromagnetic coil or Litz wire) that is wrapped, surrounded, or otherwise covered in a ferromagnetic material 24*a*. When an electric current (e.g., an alternating current) is run through the wire 24*b*, a magnetic field is created which causes the surrounding ferromagnetic material 24*a* to heat via induction heating. When or if or as the ferromagnetic material 24*a* approaches a temperature at its Curie point, the ferromagnetic material 24*a* loses its magnetic properties and thus stops heating. If the temperature of the material subsequently drops below or decreases from the Curie point, the material 24*a* begins to regain its magnetic properties and heats again towards or to its Curie point. Thus the temperature of the ferromagnetic material may be controlled and may self-regulate by electrically charging the central wire 24*b*, creating a magnetic field to which the ferromagnetic material 24*a* is subjected so that the ferromagnetic material 24*a* may reach and maintain a temperature at or near its Curie point.

The first heating blanket 20 and the second heating blanket 22 may be tailored to the processing requirements of the composite material and size for the required Watt density needed to overcome the thermal load of sea water. For example, the Curie temperature of the ferromagnetic material 24*a* of the heating blankets may be greater than or equal to the threshold curing temperature of the composite material so that, when the blankets are electrically operated, the ferromagnetic heating blankets provide an even distribution of heat across the inner layer 12 that is greater than or equal to the required curing temperature of the composite material. Furthermore, because heating of the heating blankets is essentially capped or limited by the Curie temperature of the ferromagnetic material, a portion of the patch that is out of or above the water-line will not experience greater heating than a portion of the patch that is in or below the water-line. That is, the heating blankets will reach the same threshold temperature both above and below the water-line.

The heating blankets may be electrically powered via any suitable power source. For example, a power source, such as a battery module, may be integrated into the patch assembly 10. Optionally, the heating blankets may be electrically powered via a power source remote from the patch assembly 10, such as at the vessel being repaired or at a different vessel performing the repairs. As shown in FIG. 4, an electrical connector 28 extending from the perimeter region 18 of the patch 10 may provide electrical connection between the power source and the patch 10.

As shown in FIGS. 3-5, a vacuum membrane may be disposed between each of the heating blankets and the respective outer layer. That is, a first vacuum membrane layer 30 is disposed between the first outer layer 14 and the first heating blanket 20 and a second vacuum membrane layer 32 is disposed between the second outer layer 16 and the second heating blanket 22 such that the first heating blanket 20, the second heating blanket 22 and the inner layer 12 are sealed within a vacuum bag formed by the vacuum membrane layers. The respective vacuum membrane layers provide an added layer of thermal insulation between the environment and the heating blankets. Thus, the inner layer 12 of composite material is sandwiched between the first heating blanket 20 and the second heating blanket 22. The heating blankets and inner layer 12 are sandwiched, and optionally sealed between, the first vacuum membrane layer 30 and the second vacuum membrane layer 32. Furthermore, the first outer layer 14 and the second outer layer 16 are joined together at the perimeter region 18 of the patch assembly 10 and the vacuum membrane layers, heating blankets, and inner layer are sealed therebetween. Although shown as a substantially square or rectangular patch 10, it should be understood that the patch may comprise any suitable, substantially planar shape, such as a circular or ovoid patch or any suitable polygonal shape. The patch assembly 10 may be shaped or configured based on the damage to the hull of the vessel.

Figure 6:
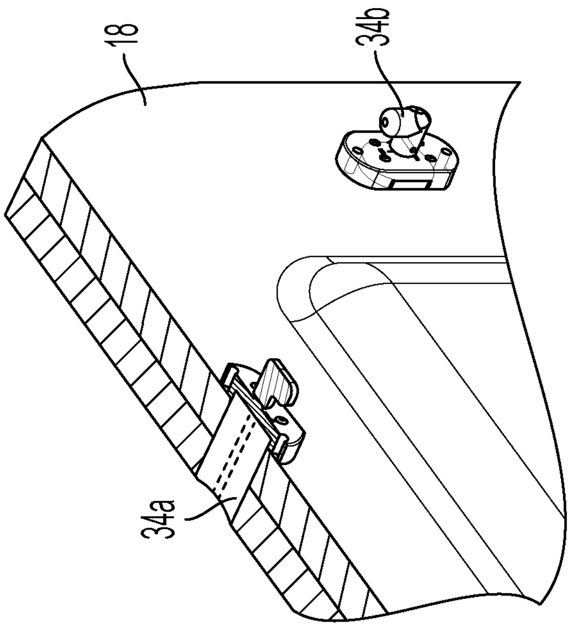
FIGS. 6 and 7 are enlarged sectional views of the patch assembly, showing a fastening element extending through the perimeter region of the patch assembly.
Figure 7:
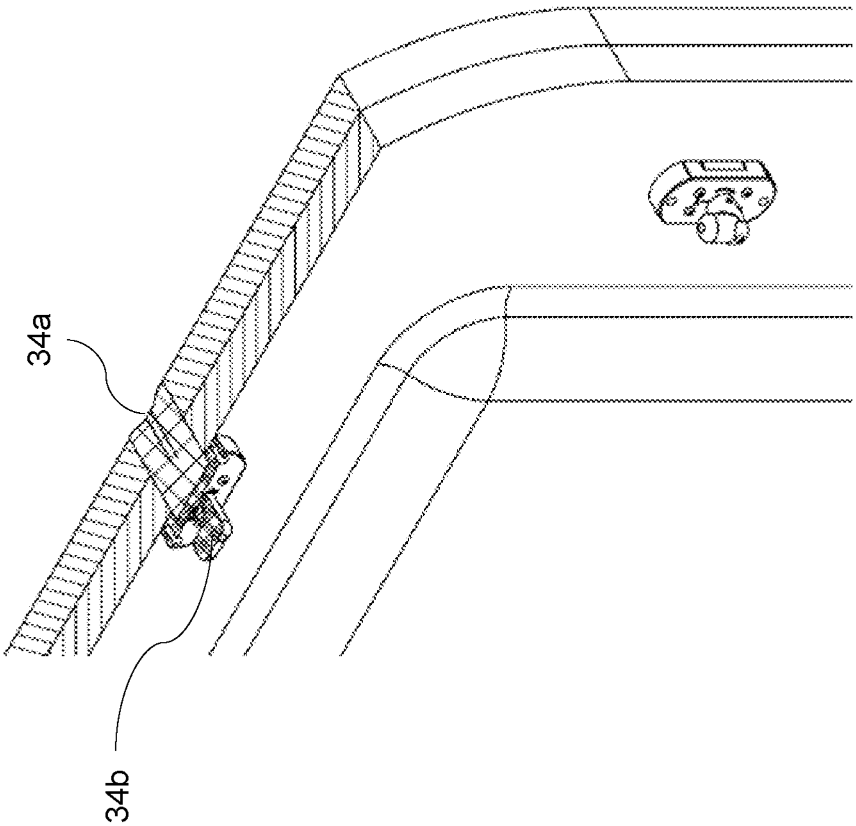

As shown in FIGS. 4A, 6, and 7, a plurality of fasteners or engagement members 34 are disposed at the perimeter region or flange 18 of the patch 10 and circumscribing the patch 10. When the patch 10 is positioned at the hull of the vessel, the fasteners 34 are configured to engage the hull and secure the patch 10 to the hull, causing the patch 10 to conform to the shape of the hull and maintain its shape relative to the hull as the inner layer 12 is cured. The fasteners 34 may include a fastening portion 34*a* disposed at a first side of an outer surface of the patch 10 (e.g., an outer facing surface of the second outer layer 16) and configured to engage and secure the patch at the hull of the vessel. For example, the fastening portions 34*a* may include suction cups or magnets, such as electromagnets, that engage and secure to the hull (e.g., the metal hull). Thus, the fastening portion 34*a* of the fastener 34 is configured to releasably engage the hull of the vessel, such as when the electromagnet is electrically charged or when the suction cup is engaged at the hull.

The fasteners 34 extend through the perimeter region 18 of the patch 10 and a handle portion 34*b* is disposed at a second side of the outer surface of the patch opposite the first side (e.g., an outer facing surface of the first outer layer 14). The handle portion 34*b* is graspable by a user for positioning the patch assembly at the hull. Optionally, the patch assembly 10 may be positioned at the hull robotically, such that a robot or other device manipulates the patch 10 to position the patch at the hull and engage the patch to the hull of the vessel. The plurality of fasteners 34 may be positioned about the perimeter region 18 of the patch 10 in any suitable configuration. For example a fastener 34 may be disposed at each corner of the patch 10, or the fasteners may be equally distributed about the perimeter of the patch (FIG. 4).

Thus, the patch assembly 10 includes magnets or suction devices for securing the patch to the hull, and the magnets or suction devices are incorporated on the perimeter of the patch. The fasteners pull the patch to the hull and hold or secure it in place while heating and cooling the composite. The magnets may be permanent magnets or electromagnets.

Figure 8A:
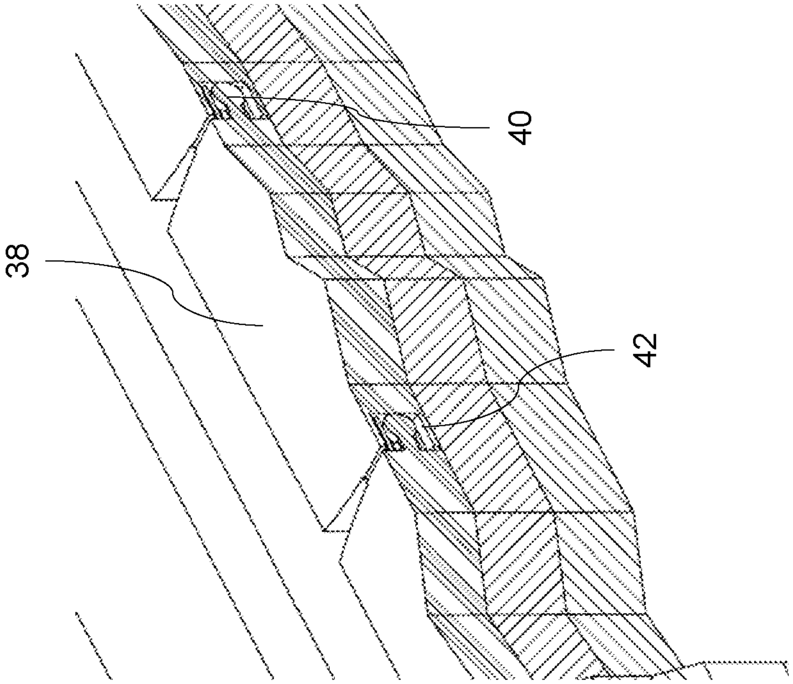
FIG. 8A is a sectional view of the patch assembly taken along line A-A of FIG. 8.
Figure 8:
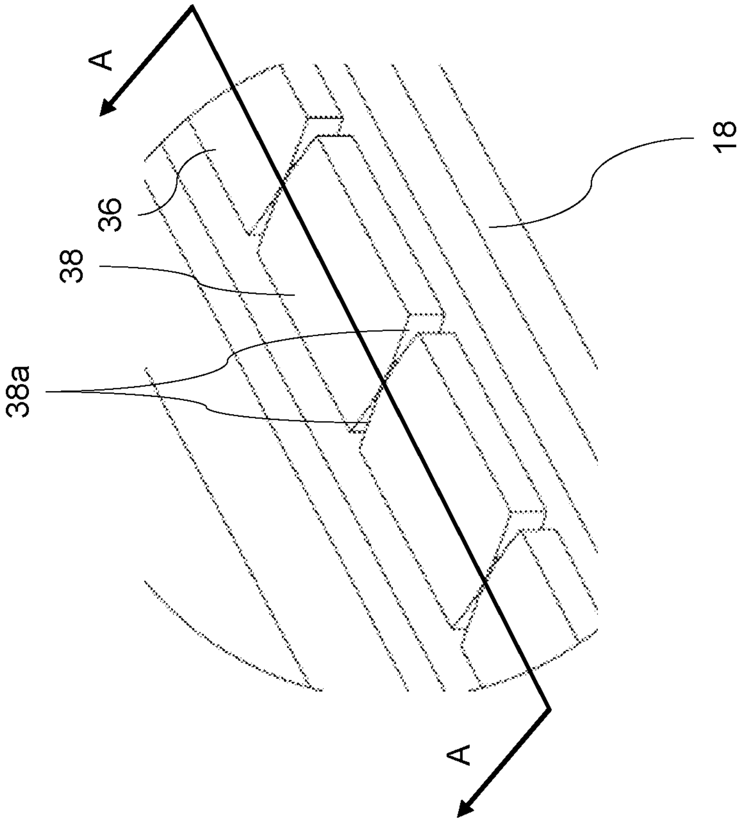
FIG. 8 is an enlarged view of the patch assembly, showing a flexible spine disposed at the perimeter region of the patch assembly.

As shown in FIGS. 8 and 8A, a flexible spine 36 may be assembled at the perimeter region 18 of the patch 10. The flexible spine 36 may be disposed at the perimeter region 18 at one or both exterior sides of the patch 10. Optionally, the flexible spine 36 may be integrally formed with the perimeter region 18, such as sealed between the first outer layer 14 and the second outer layer 16. The flexible spine 36 may include a series of rigid structures or blocks 38 extending along the perimeter region 18 and connected to one another via universal pivot members 40. For example, each block 38 may include a ball or pivot member 40 at one end of the block 38 and a socket 42 at an opposite end of the block 38. The pivot member 40 of one block 38 is received in the socket 42 of the adjacent block 38 as the flexible spine 36 extends about the perimeter region 18 and the pivot member 40 pivots relative to the socket 42 as the blocks 38 move relative to one another. Optionally, the flexible spine 36 may comprise a flexible rod, such as a fiberglass rod.

The flexible spine 36 is configured to partially restrict movement and flexing of the patch 10 when the inner layer 12 is uncured so that the patch 10 may be more easily manipulated when being secured to the hull. For example, when the patch 10 is at least partially submerged in the water, movement of the water may encourage movement of the patch 10 relative to the hull, which can affect the ability of the patch 10 to conform to the shape of the hull when uncured. The flexible spine 36 restricts movement of the patch 10 so that the patch 10 may more easily conform to the shape of the hull and resist environmental forces (e.g., from the water).

That is, the flexible spine 36 may restrict a range of motion or flexing of the patch 10 before the inner layer 12 is cured. For example, the ball and socket connection between adjacent blocks 38 of the flexible spine 36 may be configured to limit movement of adjacent blocks 38 relative to one another. As shown in FIGS. 8 and 8A, tapered edges or sides 38*a* of the blocks 38 extending from opposite sides of the pivot member 40 and socket 42 allow adjacent blocks 38 to pivot relative to one another in opposing first and second lateral directions (i.e., along a plane parallel to a primary plane of the patch 10), while restricting movement of adjacent blocks relative to one another in directions perpendicular to the first and second lateral directions (i.e., along a plane perpendicular to the primary plane of the patch). Thus, the flexible spine 36 may allow the patch 10 to curl in clockwise or counter-clockwise directions (e.g., clockwise and counter-clockwise in FIG. 4) about a center point of the primary plane of the patch 10 (e.g., defined by the inner layer 12) and the flexible spine 36 may restrict flexing or curling in perpendicular directions (e.g., left and right in FIG. 4A).

Figure 9:
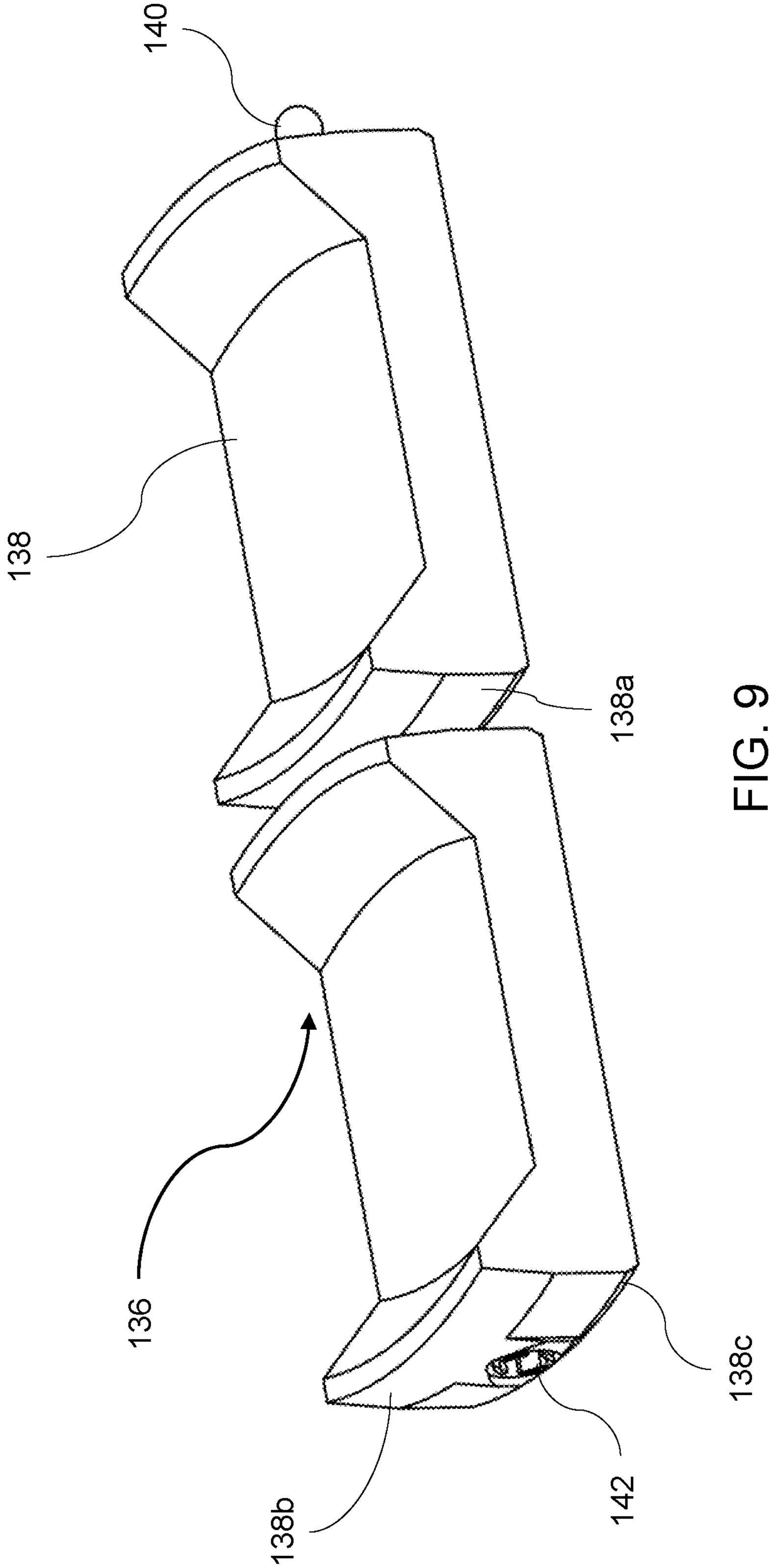
FIG. 9 is a perspective view of a flexible spine having tapered edge surfaces.
Figure 10:
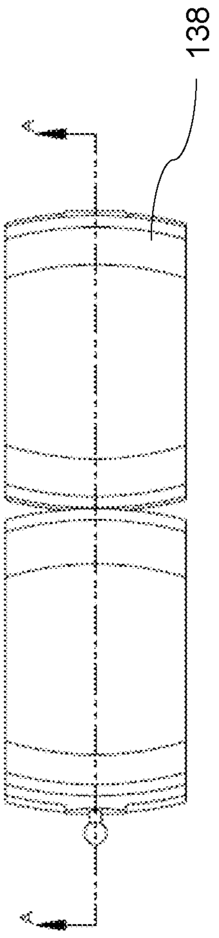
FIG. 10 is a plan view of the flexible spine of FIG. 9.
Figure 10A:
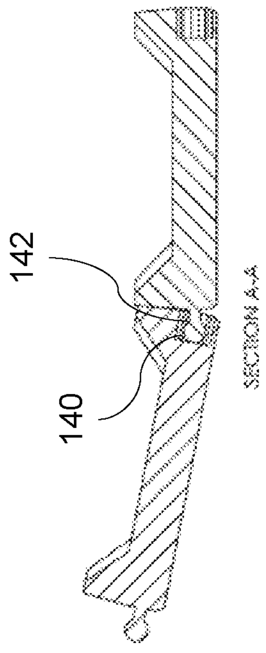
FIG. 10A is a sectional view of the flexible spine taken along the line A-A in FIG. 10, showing the flexible spine flexed in an upward direction.
Figure 10B:
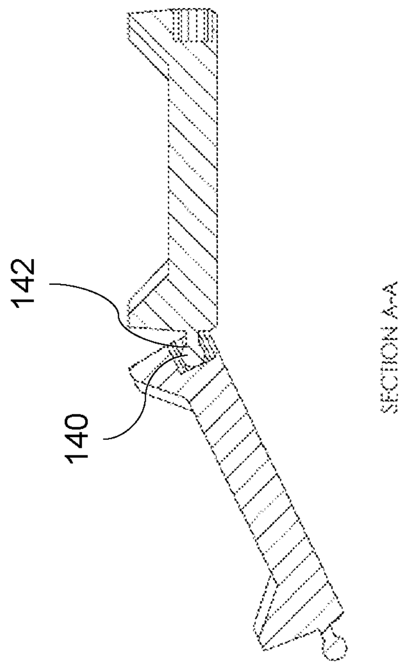
FIG. 10B is a sectional view of the flexible spine taken along the line A-A in FIG. 10, showing the flexible spine flexed in a downward direction.

Optionally, the flexible spine may be configured to allow limited range of motion both in the directions parallel to the primary plane of the patch (e.g., clockwise and counter-clockwise in FIG. 4) and in directions perpendicular to the primary plane of the patch (e.g., left and right in FIG. 4A). As shown in FIGS. 9-10B, a flexible spine 136 includes a series of rigid structures or blocks 138 that are connected to one another via respective pivot or ball members 140 received in respective sockets 142 of adjacent blocks 138. The ends of the blocks 138 include tapered side edges 138*a* extending from opposite sides of the pivot member 140 and socket 142 to allow adjacent blocks 138 to pivot relative to one another in the opposing first and second lateral directions parallel to the primary plane of the patch. Furthermore, the ends of the blocks 138 include an upper tapered edge or surface 138*b* and a lower tapered edge or surface 138*c* extending, respectively, above and below the pivot joint to allow for movement of the blocks relative to one another in directions perpendicular to the plane of the patch. The respective tapered edges or surfaces may be dimensioned according to a desired range of motion of the spine and patch in each direction. For example, and as shown in FIGS. 10A and 10B, the upper tapered surfaces 138*b* may be configured to allow for a smaller or shorter range of motion in the upward direction (upward in FIGS. 10A and 10B) and perpendicular to the plane of the patch (which may correspond to a generally concave shape of the patch relative to the hull of the vessel) and the lower tapered surfaces 138*c* may be configured to allow for a larger range of motion in the downward direction (downward in FIGS. 10A and 10B) and perpendicular to the plane of the patch (which may correspond to a generally convex shape of the patch relative to the hull of the vessel). Thus, the flexible spine 136 including the blocks 138 may allow for a greater range of motion of the patch toward a convex shape than toward a concave shape. The tapered surfaces limit motion of the blocks by engaging one another as the blocks are moved relative to one another at the pivot joints.

Figure 13A:
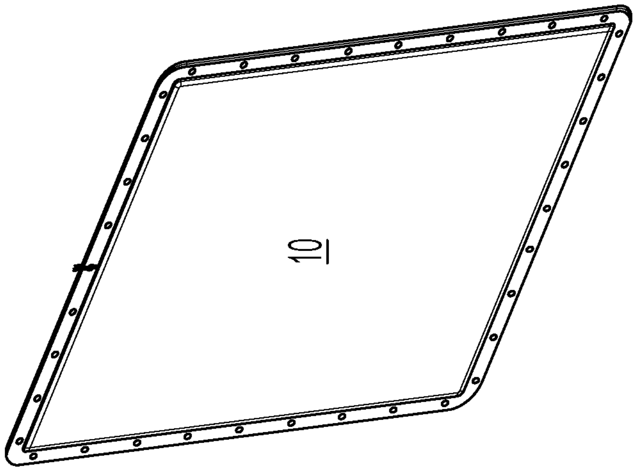
FIG. 13A is an enlarged view of the area A in FIG. 13, showing the patch assembly attached to the hull of the vessel.
Figure 13:
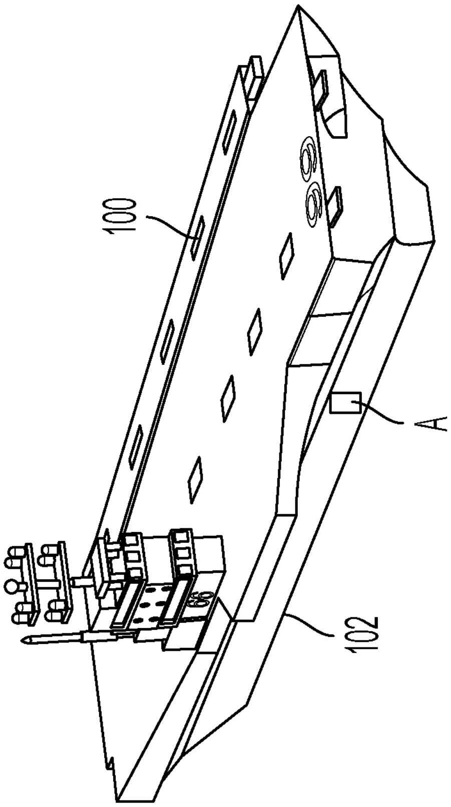
FIG. 13 is a perspective view of a vessel with a patch assembly attached to the hull of the vessel.

Thus, and as shown in FIGS. 13 and 13A, when a vessel 100 sustains damage to its hull 102, such as a hole or tear or dent is formed in the hull 102, at or near or at least partially below the water-line, a patch 10 may be positioned at or over the damaged area. For example, the patch 10 may be positioned at or near and extending at least partially over a hole in the hull 102 (with the patch positioned either at the exterior side of the hull or at the interior side of the hull). With the inner layer 12 in the uncured state, the patch 10 is positioned at the hull 102 and magnets hold the patch 10 to the hull 102. Thus, the patch 10 and inner layer 12 flex to conform to the shape of the hull 102. The patch 10 may be positioned manually (such as by divers or another vessel positioned in the water surrounding the vessel 100). Optionally, the patch 10 may be positioned robotically by autonomous or remote controlled robots positioned in the water surrounding the vessel 100.

With the patch 10 positioned at the hull and conformed to the shape of the hull at or near or surrounding the damaged area, the one or more ferromagnetic heating elements are electrically operated to heat the composite layer 12. After heating, when the composite layer 12 cools and cures, the shape of the composite layer 12 is fixed relative to the shape of the hull 102.

With the shape of the composite layer 12 fixed relative to the shape of the hull 102, the composite layer 12 may be removed from the patch assembly and fastened or adhered to the hull 102. That is, the composite layer 12 may be separated from the other layers (e.g., the outer layers of thermally insulating material, the vacuum membranes, and the ferromagnetic heating blankets), and the composite layer 12 is mechanically fastened to the hull 102 to patch or cover or seal the damaged area of the hull 102. For example, sealing may be accomplished by activating a foamable sealer embedded into the outside periphery of the patch assembly 10 after the composite has been cured. Optionally, the composite layer 12 is mechanically fastened to the hull 102 via bolts or other suitable mechanical fasteners.

Figure 14A:
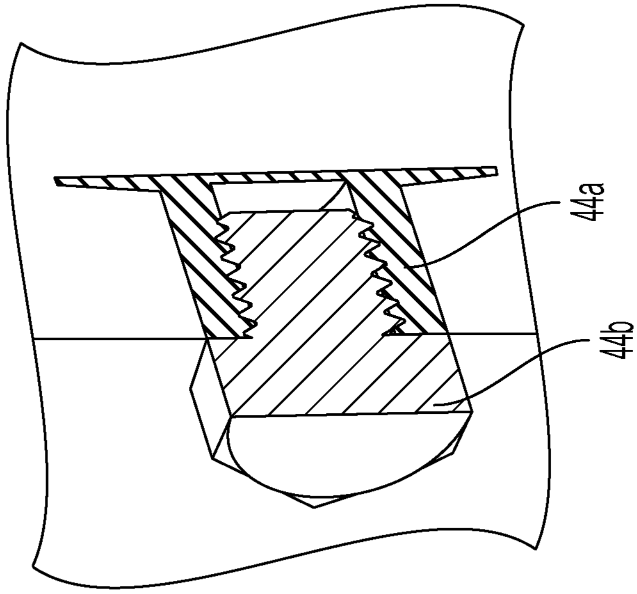
FIG. 14A is a sectional view of the fastener taken along line A-A in FIG. 14.
Figure 14:
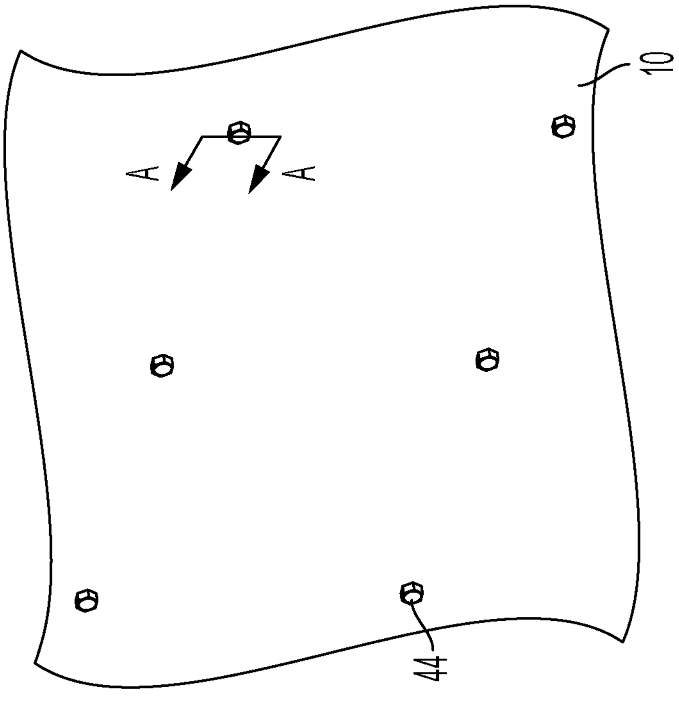
FIG. 14 is a perspective view of the patch assembly with integrated fasteners.
Figure 15A:
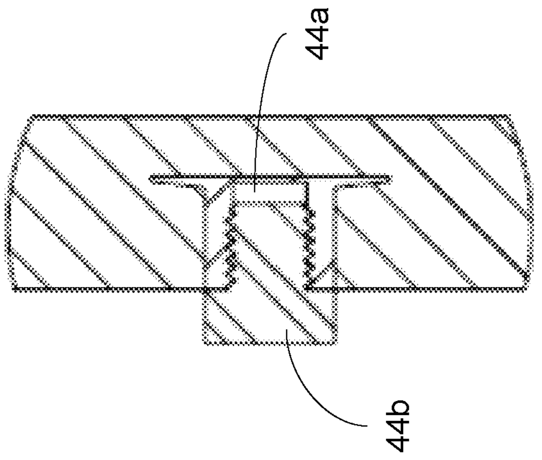
FIG. 15A is a sectional view of the fastener taken along line A-A in FIG. 15.
Figure 15:
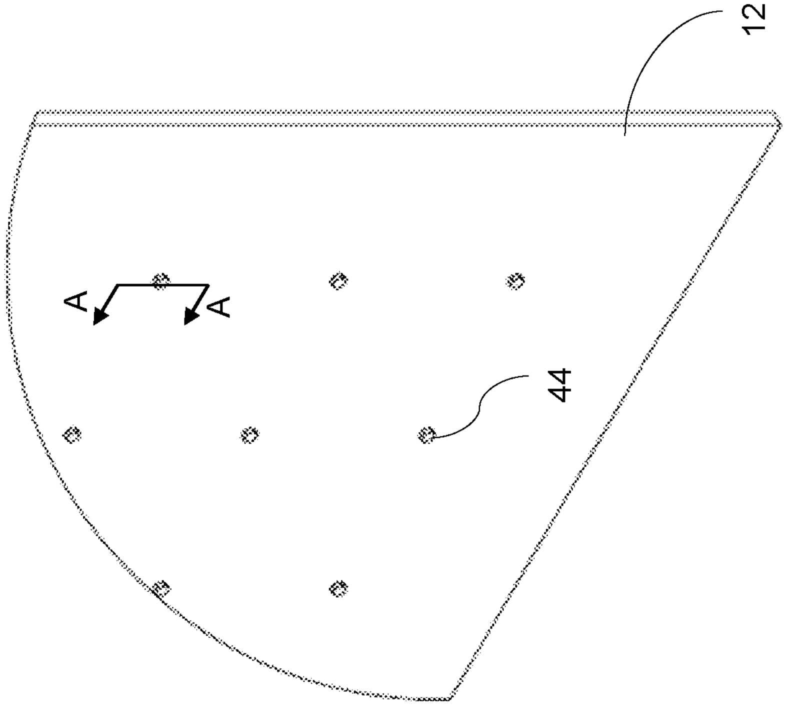
FIG. 15 is a perspective view of the inner composite layer with integrated fasteners.

As shown in FIGS. 14-15A, the patch 10 may include integrated fasteners 44, such as for connecting adjacent patches to one another or for fastening the patch to the hull of the vessel. For example, FIGS. 14 and 14A depict the fasteners 14 integrated into the patch 10, such as disposed at or integrated with the outer thermally insulating layer of the patch 10. In the illustrated example, the fasteners 44 include a receiving portion 44*a*, such as a threaded receiving portion, integrated with the patch and a bolt or attaching portion 44*b*, such as a correspondingly threaded bolt, configured to attach to the receiving portion 44*a* at the patch. The bolt portions 44*b* may be threaded through another structure and then threadably received at the receiving portions 44*a* to attach the patch to the structure. For example, the patch 10 may be disposed at an interior side of the hull and the bolt 44*b* may extend through the portion of the hull surrounding the damaged portion and be received at a receiving portion 44*a* at the interior side of the hull to attach the patch to the hull. Thus, the fasteners 44 integrated into the patch may be used to brace the patch to the damaged area of the hull or to attach a doubler. That is, a first patch and a second patch may be connected to one another (such as in an at least partially overlapping fashion) via fasteners 44 to increase the coverage area of the patch system.

Furthermore, and as shown in FIGS. 15 and 15A, the fasteners 44 may be integrally formed with the inner composite layer 12 so that, after curing of the inner composite layer 12, the bolt portion of the fastener 44*b* may be threaded through the hull and received at the receiving portion 44*a* to fasten and seal the composite layer 12 at the hull. The bolt portion 44*b* may include a cap to seal the receiving portion 44*a* when threadably received therein.

Optionally, one or more electronic sensors may be imbedded in the patch 10, such as within the perimeter region 18 of the patch 10. For example, one or more thermal sensors may be disposed at the patch 10 to provide sensor data related to a temperature of the inner layer 12, such that a user or control system receiving the sensor data may determine whether the composite material has reached a suitable temperature for curing and/or whether the composite material has been heated to the threshold curing temperature for at least a threshold period of time (such as 1 minute or longer, 5 minutes or longer, 15 minutes or longer, and the like). Optionally, one or more sensors or electronic components may be positioned at the patch to assist a robot or user in localizing the patch to the robot and positioning the patch at the vessel. Thus, if the damaged area is below the water-line where visibility is low, the patch may be positioned via captured sensor information.

Thus, a temporary composite repair system or temporary composite repair package is provided to repair hull damage at or below the water-line. A temporary repair package, which is essentially a patch kit that would be carried onboard the vessel, includes a patch of fibers and resin composite, such as KEVLAR® or poly-praraphenylene terephthalamide and nylon. On one side of the composite assembly is a ferromagnetic heating blanket tucked inside of a vacuum membrane. The patch may be connected to a power source and/or a controller for operating the ferromagnetic heating blanket, such as to deliver electricity to heat the ferromagnetic heating blanket to its Curie temperature for at least a threshold period of time, where the controller receives sensor data from the sensor at the patch assembly for determining whether the patch has reached the threshold curing temperature for at least the threshold period of time.

In the event of hull damage, the patch kit is lowered overboard and divers use magnets to conform and hold the patch against the hull. The heating blankets then cure the composite to create a rigid patch that matches the contours of the damaged area. A foaming below-water-line adhesive is then used to bond and seal the patch to the hull. As water is pumped out from the vessel, the hydrostatic pressure further assists to hold the patch in place and additional fasteners can be used to secure the patch in place. The fasteners can be traditional bolts or rivets or integrated into the patch panel. This allows the vessel to safely and quickly sail to port for additional repair, or to continue operation as usual. Alternatively, the patch can similarly be used for an internal repair. The patch may be located manually with the use of divers or robotically.

Additionally, the system can be packaged complete with power supply, heating blankets, patch kit, and all other necessary components. With proper composite selection and air-tight storage, the system should maintain an infinite shelf life.

To allow the system to be positioned in the water without collapsing, a spine of sorts is around the perimeter of system. The spine allows the patch to bend in certain directions and resist bending in other directions. The spine includes a series of blocks that connect to each other with a universal pivot. The geometry of the block allows the system to curl freely in one direction while limiting curl in an opposite direction. For example, the spine may allow for flexing or curling in a clockwise direction, while limiting curl in a counter-clockwise direction. Optionally, a flexible fiberglass rod can be used.

Furthermore, composites may be stronger than steel and are highly conformable when un-cured. A challenge to overcome is providing the heat required to cure the composite underwater. Composite repair materials may require a temperature of 250 degrees Fahrenheit or higher to cure. Achieving this temperature while the composite material is submerged may require thermal insulation on exterior of the patch and a heat blanket with a very large Watt density, such as a greater Watt density than can be generated by a resistive heating system.

An inductive heating system excels in the application. Induction heating elements respond very quickly to temperature changes and thus may overcome the thermal load of the hull and water to cure the composite. Additionally, ferromagnetic wires are a perfect pair with induction and have proven to provide rapid and reliable heating in blanket applications.

The heat source is made from a ferromagnetic material that is wound around a flexible wire that carries an induction current. The induction current produces a magnetic field that heats the ferromagnetic material. The ferromagnetic material, however, has a material property where it become non-magnetic at a specific temperature. Once an area of the heating element becomes non-magnetic, that specific area no longer heats while the surrounding area does continue to heat. Additionally, any point where the temperature drops, that point becomes magnetic and begins to heat until it becomes non-magnetic again. This type of heating element responds much more quickly than a resistive heating element and is capable of producing the enormous Watt densities required to cure a composite under water. Additionally, if a repair has to be made at or near or below the water-line, such that the patch is partially submerged, the temperature levelling properties of the ferromagnetic heating element ensure the submerged area heats enough without overheating the non-submerged areas.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A method for repairing a damaged water vessel, the method comprising:

providing a patch assembly comprising (i) a first flexible outer layer, (ii) a second flexible outer layer and (iii) an inner layer of composite material sealed between the first flexible outer layer and the second flexible outer layer;

wherein, when the inner layer is heated and then cures, the composite material transforms from an uncured state, where the inner layer is flexible, to a cured state, where a shape of the inner layer is fixed;

wherein an electric heating element is disposed between the inner layer and the first flexible outer layer, and wherein, when the electric heating element is electrically operated, the electric heating element generates heat at the inner layer;

with the composite material in the uncured state, positioning the patch assembly at a damaged area of a hull of a water vessel so that an outer surface of the patch assembly engages the hull at and around the damaged area and the inner layer flexes to conform to a shape of the hull;

with the patch assembly engaging the hull and with the inner layer flexed to conform to the shape of the hull, electrically operating the electric heating element to heat the inner layer, wherein, after the electric heating element heats the inner layer and the inner layer cures, the composite material is in the cured state, where the shape of the inner layer is fixed relative to the shape of the hull; and with the shape of the inner layer fixed relative to the shape of the hull, attaching the inner layer to the hull at and around the damaged area.

2. The method of claim 1, wherein the electric heating element comprises a ferromagnetic heating element.

3. The method of claim 2, wherein the ferromagnetic heating element comprises an electrically conductive material and a ferromagnetic material, and wherein, when the ferromagnetic heating element is electrically operated, the electrically conductive material is electrically charged to create a magnetic field at the ferromagnetic heating element and the ferromagnetic material generates heat responsive to the created magnetic field.

4. The method of claim 2, wherein the ferromagnetic heating element comprises a ferromagnetic heating blanket.

5. The method of claim 1, wherein the first flexible outer layer and the second flexible outer layer comprise a thermally insulating material.

6. The method of claim 1, wherein a vacuum membrane is disposed between the electric heating element and the first flexible outer layer, and wherein the vacuum membrane applies a vacuum pressure between the electric heating element and the inner layer.

7. The method of claim 1, wherein the first flexible outer layer and the second flexible outer layer are joined together at a perimeter region of the patch assembly.

8. The method of claim 7, wherein a flexible spine is disposed at the perimeter region of the patch assembly, and wherein the flexible spine is configured to flex as the inner layer flexes, and wherein flexing of the flexible spine is limited to limit flexing of the inner layer.

9. The method of claim 8, wherein the flexible spine comprises a plurality of blocks pivotally connected to one another in series.

10. The method of claim 8, wherein the flexible spine comprises a flexible fiberglass rod.

11. The method of claim 8, wherein flexing of the flexible spine is limited in a direction that is perpendicular to a primary plane of the patch assembly.

12. The method of claim 7, wherein a plurality of fasteners are disposed about the perimeter region of the patch assembly, and wherein the plurality of fasteners, when the patch assembly is positioned at the hull, engage the hull to releasably attach the patch assembly to the hull.

13. The method of claim 12, wherein the plurality of fasteners comprise a plurality of magnets.

14. The method of claim 13, wherein the plurality of magnets comprise a plurality of electromagnets.

15. The method of claim 12, wherein the plurality of fasteners comprise a plurality of suction cups.

16. The method of claim 12, wherein each fastener of the plurality of fasteners comprises (i) a fastening portion disposed at a first side of the outer surface of the patch assembly that engages the hull, and that engages the hull to releasably attach the patch assembly to the hull, and (ii) a handle portion disposed at a second side of the outer surface of the patch assembly that is opposite the first side, and that is graspable by a user for positioning the patch assembly at the hull.

17. The method of claim 1, wherein the inner layer comprises a plurality of fasteners for attaching the inner layer to the hull at and around the damaged area.

18. The method of claim 1, wherein a second electric heating element is disposed between the inner layer and the second flexible outer layer, and wherein, when the second electric heating element is electrically operated, the second electric heating element generates heat at the inner layer.

19. The method of claim 18, wherein a first vacuum membrane is disposed between the electric heating element and the first flexible outer layer and a second vacuum membrane is disposed between the second electric heating element and the second flexible outer layer.

20. The method of claim 1, wherein attaching the inner layer to the hull comprises activating an expanding adhesive.

21. The method of claim 1, comprising, before attaching the inner layer to the hull, removing the inner layer from between the first flexible outer layer and the second flexible outer layer.

22. The method of claim 1, wherein the damaged area of the hull is at least partially submerged under water.

23. The method of claim 1, wherein the composite material comprises a thermoset resin.

24. The method of claim 1, wherein the composite material comprises a thermoplastic resin.

25. The method of claim 1, wherein the patch assembly further comprises one or more sensors, and wherein sensor data captured by the one or more sensors is processed for locating the patch assembly at the damaged area of the hull.

26. The method of claim 25, wherein the one or more sensors are imbedded into the patch assembly.

27. The method of claim 1, wherein the inner layer of composite material is enclosed in a vacuum bag.

28. The method of claim 1, wherein the electric heating element generates heat at the inner layer via induction heating.

29. A water vessel repair system, the water vessel repair system comprising:

a patch assembly comprising (i) a first flexible outer layer, (ii) a second flexible outer layer and (iii) an inner layer of composite material sealed between the first flexible outer layer and the second flexible outer layer;

wherein the first flexible outer layer and the second flexible outer layer are joined together at a perimeter region of the patch assembly;

wherein, when the inner layer is heated and then cures, the composite material transforms from an uncured state, where the inner layer is flexible, to a cured state, where the inner layer has a fixed shape;

an electric heating element disposed between the inner layer and the first flexible outer layer, wherein, when the electric heating element is electrically operated, the electric heating element generates heat at the inner layer;

wherein, with the composite material in the uncured state, and with the patch assembly positioned at a damaged area of a hull of a water vessel, an outer surface of the patch assembly engages the hull at and around the damaged area and the inner layer flexes to conform to a shape of the hull;

wherein, with the patch assembly engaging the hull, and with the inner layer flexed to conform to the shape of the hull, electrically operating the electric heating element heats the inner layer, and wherein, after the electric heating element heats the inner layer and the inner layer cures, the composite material is in the cured state, where the inner layer has the fixed shape that is conformed to the shape of the hull; and wherein, with the fixed shape of the inner layer conformed to the shape of the hull, and with the inner layer removed from between the first flexible outer layer and the second flexible outer layer, the inner layer is configured to be attached to the hull at and around the damaged area.

30. The water vessel repair system of claim 29, wherein the electric heating element comprises a ferromagnetic heating element.

31. The water vessel repair system of claim 30, wherein the ferromagnetic heating element comprises an electrically conductive material and a ferromagnetic material, and wherein, when the ferromagnetic heating element is electrically operated, the electrically conductive material is electrically charged to create a magnetic field at the ferromagnetic heating element and the ferromagnetic material generates heat responsive to the created magnetic field.

32. The water vessel repair system of claim 29, wherein a vacuum membrane is disposed between the electric heating element and the first flexible outer layer, and wherein the vacuum membrane applies a vacuum pressure between the electric heating element and the inner layer.

33. The water vessel repair system of claim 29, wherein a flexible spine is disposed at the perimeter region of the patch assembly, and wherein the flexible spine is configured to flex as the inner layer flexes, and wherein flexing of the flexible spine is limited to limit flexing of the inner layer.

34. The water vessel repair system of claim 29, wherein a plurality of fasteners are disposed about the perimeter region of the patch assembly, and wherein the plurality of fasteners, when the patch assembly is positioned at the hull, engage the hull to releasably attach the patch assembly to the hull.

35. The water vessel repair system of claim 29, wherein a second electric heating element is disposed between the inner layer and the second flexible outer layer, and wherein, when the second electric heating element is electrically operated, the second electric heating element generates heat at the inner layer.

36. The water vessel repair system of claim 29, wherein the composite material comprises one selected from the group consisting of (i) a thermoset resin and (ii) a thermoplastic resin.

37. A method for repairing a damaged water vessel, the method comprising:

providing a patch assembly comprising (i) a first flexible outer layer, (ii) a second flexible outer layer and (iii) an inner layer of composite material sealed between the first flexible outer layer and the second flexible outer layer;

wherein the first flexible outer layer and the second flexible outer layer are joined together at a perimeter region of the patch assembly;

wherein, when the inner layer is heated and then cures, the composite material transforms from an uncured state, where the inner layer is flexible, to a cured state, where a shape of the inner layer is fixed;

wherein a first ferromagnetic heating element is disposed between the inner layer and the first flexible outer layer and a second ferromagnetic heating element is disposed between the inner layer and the second flexible outer layer, and wherein, when the first ferromagnetic heating element and the second ferromagnetic heating element are electrically operated, the first ferromagnetic heating element and the second ferromagnetic heating element generate heat at the inner layer;

wherein a first vacuum membrane is disposed between the first ferromagnetic heating element and the first flexible outer layer and a second vacuum membrane is disposed between the second ferromagnetic heating element and the second flexible outer layer, and wherein the first vacuum membrane and the second vacuum membrane apply vacuum pressure between the inner layer and the first ferromagnetic heating element and the second ferromagnetic heating element;

wherein the first ferromagnetic heating element and the second ferromagnetic heating element each comprise an electrically conductive material and a ferromagnetic material, and wherein, when the first ferromagnetic heating element and the second ferromagnetic heating element are electrically operated, the electrically conductive materials are electrically charged to create a magnetic field at the respective ferromagnetic heating elements and the respective ferromagnetic materials generate heat responsive to the created magnetic fields;

with the composite material in the uncured state, positioning the patch assembly at a damaged area of a hull of a water vessel so that an outer surface of the patch assembly engages the hull at and around the damaged area and the inner layer flexes to conform to a shape of the hull, and wherein the damaged area of the hull is at least partially submerged under water;

with the patch assembly engaging the hull and with the inner layer flexed to conform to the shape of the hull, electrically operating the first ferromagnetic heating element and the second ferromagnetic heating element to heat the inner layer, wherein, after the first ferromagnetic heating element and the second ferromagnetic heating element heat the inner layer and the inner layer cures, the composite material is in the cured state, where the shape of the inner layer is fixed relative to the shape of the hull; and with the shape of the inner layer fixed relative to the shape of the hull, attaching the inner layer to the hull at and around the damaged area.

38. The method of claim 37, wherein a flexible spine is disposed at the perimeter region of the patch assembly, and wherein the flexible spine is configured to flex as the inner layer flexes, and wherein flexing of the flexible spine is limited to limit flexing of the inner layer.

39. The method of claim 38, wherein the flexible spine comprises a plurality of blocks pivotally connected to one another in series.

40. The method of claim 37, wherein a plurality of fasteners are disposed about the perimeter region of the patch assembly, and wherein the plurality of fasteners, when the patch assembly is positioned at the hull, engage the hull to releasably attach the patch assembly to the hull.

41. The method of claim 40, wherein the plurality of fasteners comprise one selected from the group consisting of (i) a plurality of magnets and (ii) a plurality of suction cups.

42. The method of claim 37, comprising, before attaching the inner layer to the hull, removing the inner layer from between the first flexible outer layer and the second flexible outer layer.

* * * * *